United States Patent
Schwarz et al.

(10) Patent No.: US 9,431,688 B2
(45) Date of Patent: Aug. 30, 2016

(54) METHOD FOR HEATING A HIGH VOLTAGE VEHICLE BATTERY

(75) Inventors: Jonathan R. Schwarz, Clawson, MI (US); Thomas K. Dye, Novi, MI (US); Ian L. Hanna, Clarkston, MI (US); Gregory E. Smith, Toledo, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 117 days.

(21) Appl. No.: 13/085,832

(22) Filed: Apr. 13, 2011

(65) Prior Publication Data

US 2011/0288704 A1 Nov. 24, 2011

Related U.S. Application Data

(60) Provisional application No. 61/347,147, filed on May 21, 2010.

(51) Int. Cl.
*H01M 10/6571* (2014.01)
*H01M 10/615* (2014.01)
(Continued)

(52) U.S. Cl.
CPC ....... *H01M 10/6571* (2015.04); *H01M 10/615* (2015.04); *H01M 10/625* (2015.04); *H01M 10/633* (2015.04); *H01M 10/0525* (2013.01); *Y02T 10/7011* (2013.01)

(58) Field of Classification Search
CPC ....... B60K 6/24; B60K 6/48; B60L 11/1874; B60L 11/187; B60L 8/00; B60L 3/0046; H01M 10/425; H01M 10/5006; H01M 10/5022; H01M 2/1016; H01M 10/5085; H01M 10/502; B23K 3/033; F01N 5/02; B60S 1/3805; F02M 31/125

USPC ............. 701/22; 219/202, 209, 231, 205; 180/65.29; 320/150, 126; 429/120, 62; 60/320; 15/250.07; 123/552
See application file for complete search history.

(56) References Cited

U.S. PATENT DOCUMENTS

| | | | |
|---|---|---|---|
| 4,463,738 A * | 8/1984 | Lee | F02M 31/125 123/142.5 E |
| 4,603,451 A * | 8/1986 | VanSickle | B60S 1/3805 15/250.07 |

(Continued)

FOREIGN PATENT DOCUMENTS

DE 102008005891 A1 7/2009

OTHER PUBLICATIONS

German Office Action dated Dec. 15, 2015, 6 pages.

*Primary Examiner* — Yuri Kan
(74) *Attorney, Agent, or Firm* — Reising Ethington, P.C.; Lionel D. Anderson

(57) ABSTRACT

An exemplary system and method for use in cold environments in order to heat a high voltage vehicle battery, such as the type commonly found in hybrid vehicles. Some high voltage vehicle batteries—like those based on lithium-ion chemistries—perform better when their battery temperature is in a certain temperature range. In an exemplary embodiment, a battery heating system includes a switch, a battery heater and a high voltage vehicle battery, and initially uses electrical power from an external power source to heat the battery and then uses electrical power from an internal power source to heat the battery. The switch determines which power source is used to heat the battery, and may be dictated by whether the battery heating system is plugged into the external power source and/or a vehicle propulsion system is active, to cite several possibilities.

18 Claims, 2 Drawing Sheets

(51) Int. Cl.
  *B60K 6/48*   (2007.10)
  *H01M 10/625*   (2014.01)
  *H01M 10/633*   (2014.01)
  *H01M 10/0525*   (2010.01)

(56) References Cited

U.S. PATENT DOCUMENTS

| | | | | |
|---|---|---|---|---|
| 5,948,298 | A * | 9/1999 | Ijaz | 219/209 |
| 5,994,669 | A | 11/1999 | McCall | |
| 7,154,068 | B2 * | 12/2006 | Zhu | B60L 3/0046 219/202 |
| 7,234,552 | B2 * | 6/2007 | Prema et al. | 180/65.29 |
| 7,884,577 | B2 * | 2/2011 | Tsutsumi | H01M 10/425 320/148 |
| 2002/0117491 | A1 * | 8/2002 | Griffith | B23K 3/033 219/231 |
| 2005/0218136 | A1 | 10/2005 | Kotani | |
| 2006/0016793 | A1 * | 1/2006 | Zhu | H01M 10/615 219/205 |
| 2008/0042621 | A1 * | 2/2008 | Miglioranza | 320/150 |
| 2008/0213652 | A1 * | 9/2008 | Scheucher | B60L 8/00 429/62 |
| 2008/0268333 | A1 * | 10/2008 | Barrella | H01M 2/1016 429/120 |
| 2008/0275600 | A1 * | 11/2008 | Rask | B60K 6/24 701/22 |
| 2010/0140246 | A1 * | 6/2010 | Grider | B60K 6/48 219/205 |
| 2010/0251703 | A1 * | 10/2010 | Takeishi | F01N 5/02 60/320 |
| 2011/0089904 | A1 * | 4/2011 | Ward | 320/126 |
| 2011/0288704 | A1 * | 11/2011 | Schwarz et al. | 701/22 |

* cited by examiner

METHOD FOR HEATING A HIGH VOLTAGE VEHICLE BATTERY

REFERENCE TO RELATED APPLICATIONS

This application claims the benefit of U.S. Provisional Ser. No. 61/347,147 filed on May 21, 2010, the entire contents of which are incorporated herein.

TECHNICAL FIELD

The present invention generally relates to vehicle batteries and, more particularly, to methods for heating high voltage vehicle batteries in cold environments in order to improve their performance.

BACKGROUND

In hybrid electric vehicles (HEVs), extended-range electric vehicles (EREVs), battery electric vehicles (BEVs) and other types of vehicles that use high voltage batteries for purposes of vehicle propulsion, the state or condition of the battery can be important to the performance of the vehicle. There are a number of different battery conditions that can impact battery performance, including battery temperature. For instance, certain battery types—like those based on lithium-ion chemistries—may be negatively affected by extremely cold temperatures, as such temperatures can increase the internal resistance within the battery. If the battery temperature is cold enough, these types of batteries may not be able to sufficiently accept or provide electrical power, which in turn can affect their performance.

SUMMARY

According to one aspect, there is provided a battery heating system for use with a vehicle that comprises a switch, a battery heater and a vehicle battery. The battery heater is thermally coupled to the vehicle battery and heats the vehicle battery with electrical power from either an external power source or an internal power source depending on the state of the switch.

According to another aspect, there is provided a battery heating system for use with a vehicle that comprises a power supply, a low voltage vehicle battery, a battery heater, and a high voltage vehicle battery. The battery heater is thermally coupled to the high voltage vehicle battery and heats the high voltage vehicle battery with electrical power from either the power supply or the low voltage vehicle battery.

According to another aspect, there is provided a method for heating a vehicle battery that is at least partially used for vehicle propulsion. The method may comprise the steps of: (a) determining if a battery heating system is coupled to an external power source, wherein the battery heating system includes a switch, a battery heater, and a vehicle battery; (b) if the battery heating system is coupled to the external power source, then providing electrical power from the external power source to the battery heater through the switch; and (c) using the battery heater to heat the vehicle battery with electrical power from the external power source.

DRAWINGS

Preferred exemplary embodiments of the invention will hereinafter be described in conjunction with the appended drawings, wherein like designations denote like elements, and wherein.

DETAILED DESCRIPTION

The exemplary system and method described below may be used in cold environments in order to heat or warm up a high voltage vehicle battery, such as the type commonly found in hybrid vehicles. Some high voltage vehicle batteries, like those based on lithium-ion chemistries, perform better when their battery temperature is in a certain temperature range. In cold environments it can therefore be desirable to heat or warm up the high voltage vehicle battery with a battery heater or some other type of heating element (e.g., a battery blanket). Although the system and method are described below in the context of an exemplary hybrid electric vehicle (HEV) having a high voltage lithium-ion battery, it should be appreciated that the present system and method may be used with any number of different vehicle and/or battery types and are not limited to the exemplary embodiments shown and described herein.

A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Again, the present system and method may be used with any vehicle that employs a high voltage vehicle battery for purposes of vehicle propulsion—this includes hybrid vehicles and non-hybrid vehicles like battery electric vehicles (BEVs)—and are not limited to any particular type.

Figure 1:
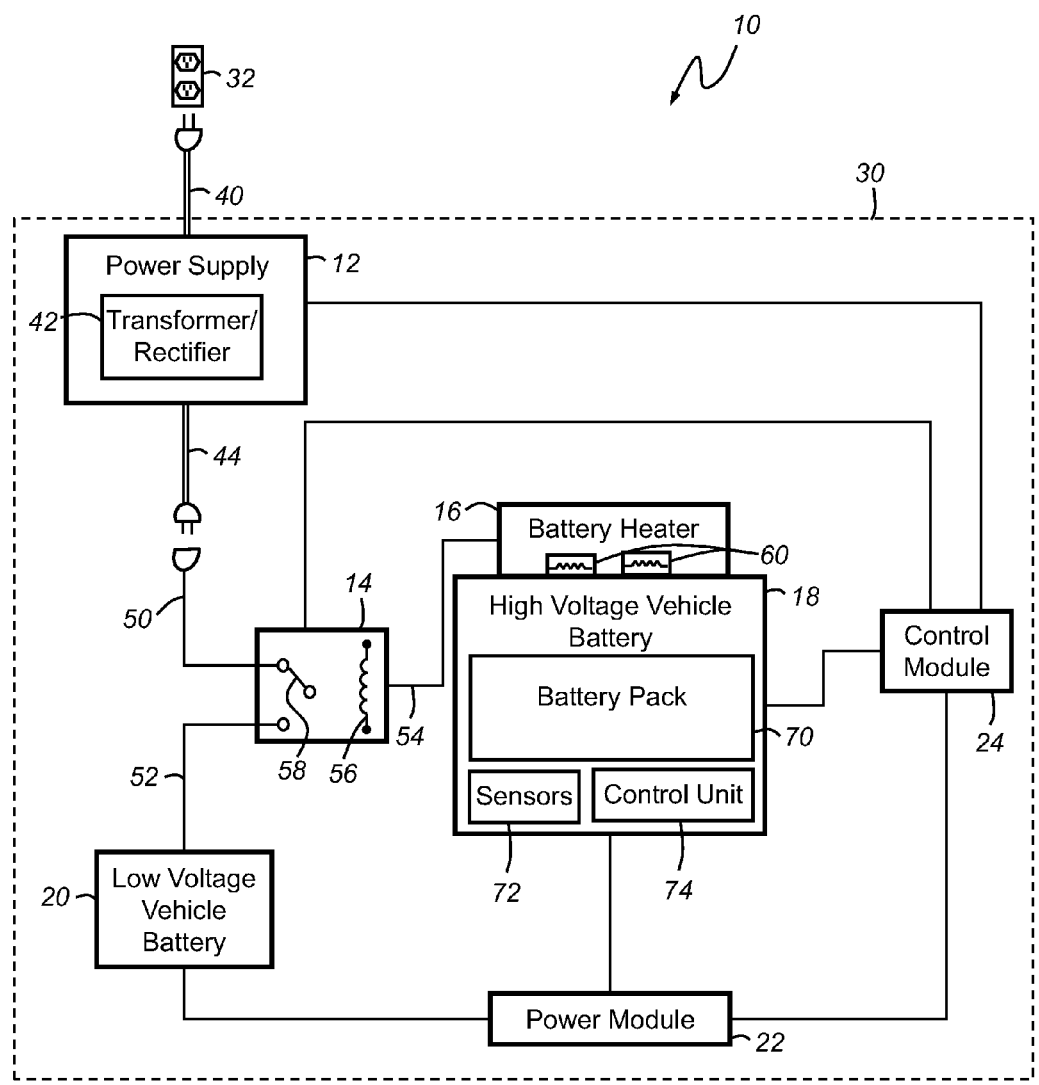
FIG. 1 is a schematic block diagram of an exemplary battery heating system.

With reference to FIG. 1, there is shown an exemplary battery heating system 10 that may be used to heat, warm up, or otherwise control the temperature of a high voltage vehicle battery. According to the exemplary embodiment shown here, battery heating system 10 includes a power supply 12, a switch 14, a battery heater 16, a high voltage vehicle battery 18, a low voltage vehicle battery 20, a power module 22, and a control module 24. Battery heating system 10 may be part of a vehicle 30, such as a hybrid electric vehicle (HEV), and can be plugged into an external power source 32, like a conventional 110 VAC or 220 VAC electrical outlet or a charging kiosk. In an exemplary embodiment, one or more components of battery heating system 10 are installed on the vehicle at a vehicle dealer, as opposed to being installed at a vehicle factory. By providing battery heating system 10 as a dealer-installed or aftermarket feature, unnecessary installation of the system on vehicles destined for warm climates can be avoided. This is not necessary, however, as battery heating system 10 may just as easily be installed at the factory or at any other suitable location.

Power supply 12 connects battery heating system 10 to external power source 32 and may include any number of components or devices needed for increasing, decreasing, converting, inverting, conditioning or otherwise transforming electrical energy. According to an exemplary embodiment, power supply 12 is installed on the vehicle by a vehicle dealer and includes a power input 40 that plugs into a standard 110 VAC electrical receptacle, a transformer/rectifier 42 that transforms the electrical energy into a form more suitable for the battery heating system, and a power output 44. Power input 40 can include a standard electrical cord and plug, such as the type commonly found on appliances, and can extend out through a slot in the vehicle grille or some other opening. When the vehicle is parked in a garage or some other location with electrical service and it is quite cold out, a vehicle user can simply plug power input 40 into an electrical receptacle so that battery heating system 10 is provided with electrical energy from external power source 32. Transformer/rectifier 42 may include any combination of components and devices that are needed to step down the voltage from 110 V to 12 V and to convert the current from AC to DC, for example, so that the electrical energy from external power source 32 is more suitable for use by battery heating system 10. This may include, for example, transformer elements, rectifier elements, filtering elements, cooling elements, sensors, electronic control units, or any other suitable components known in the art. Of course, modifications could be made to transformer/rectifier 42 so that it could be used with external power sources that provide electrical energy in a form other than 110 VAC. Power output 44 delivers the low voltage output from transformer/rectifier 42 (e.g., 12 VDC power) to battery heating system 10 and may include a pigtail, wiring harness and/or some other type of connection at its end for physically and electrically coupling to an input of switch 14.

Switch 14 dictates the source of electrical energy that is used to power or operate certain components of the battery heating system 10. In a first state, switch 14 connects battery heater 16 with power supply 12 so that electrical energy from external power source 32 is used to power the battery heater; in a second state, switch 14 connects battery heater 16 with low voltage vehicle battery 20 so that electrical energy from vehicle 30 is used to power the battery heater. Skilled artisans will appreciate that switch 14 may be provided according to a number of different embodiments. This includes providing switch 14 as a relay switch that is controlled or governed by control module 24. According to this exemplary arrangement, relay switch 14 includes power inputs 50 and 52, power output 54, a coil 56, and a switching element 58. By controlling the current flow through coil 56, control module 24 is able to manage or otherwise control the operational state of switching element 58. Power output 54 preferably provides battery heater 16 with low voltage electrical energy (e.g., 12 VDC) and therefore can be implemented using standard low voltage vehicle wiring. This avoids the use of more expensive high voltage wiring (e.g., 110 VAC wiring), which can be fairly expensive especially if the high voltage wiring needs to be run inside the vehicle's passenger compartment from the grille or underhood area to high voltage vehicle battery 18. In addition to the potential cost savings associated with the low voltage wiring, the switching arrangement shown in FIG. 1 enables battery heating system 10 to select from two different power sources (i.e., an external power source and an internal power source), but only use a single power output to connect to battery heater 16. Of course, switch 14 is not limited to relay switches or this particular arrangement, as any suitable switching arrangement may be used instead.

Battery heater 16 can heat or warm up high voltage vehicle battery 18 when it is cold outside in order to elevate the battery temperature and potentially improve the performance of the battery. A variety of different battery heaters may be used, including so-called "battery blankets" that have one or more heating elements 60 located near or proximate certain sections of high voltage vehicle battery 18. In one exemplary embodiment, battery heater 16 includes a pair of 12 VDC, 40 W resistive heating elements 60 that extend around a portion of the battery pack and are positioned within the battery pack insulation so that they can increase or raise the battery temperature. Of course, other types of battery heaters and/or heating elements could be used in place of the exemplary ones shown and described herein. Because exemplary battery heater 16 is made to run on 12 VDC power, battery heating system 10 can continue to operate after the power supply 12 is unplugged from external power source 32 and the vehicle is driven away. This feature will be explained more thoroughly below.

High voltage vehicle battery 18 provides the vehicle with electrical energy and, depending on the particular embodiment, may be the primary vehicle power source used for vehicle propulsion or it may be used in conjunction with another power source for power supplementation purposes, to cite two examples. Many different battery types and arrangements may be used, including the exemplary one schematically shown here which includes a battery pack 70, one or more battery sensors 72, and a control unit 74. Battery pack 70 may include a collection of identical or individual battery cells connected in series, parallel, or a combination of both in order to deliver a desired voltage, amperage, capacity, power density, and/or other performance characteristics. Generally, it is desirable to provide high power and energy densities, which has led to the development and use of many types of batteries including chemical, non chemical, and others. Some examples of chemical batteries that could be used include lithium ion, lead acid, advanced lead acid, nickel metal hydride (NiMH), nickel cadmium (NiCd), zinc bromide, lithium polymer, sodium nickel chloride (NaNiCl), zinc air, vanadium redox, and others. Other chemical battery types include aluminum air, iron air, lithium iron sulfide, nickel iron, nickel zinc, silver zinc, sodium sulfur, zinc chlorine, zinc manganese, and more. According to one embodiment, battery pack 70 includes a large number of lithium ion cells, each of which exhibits between 2 VDC-4 VDC when charged and is connected in a series and/or parallel configuration with its adjacent cells, so that the overall battery pack delivers between 300 VDC-400 VDC of power. Skilled artisans will appreciate that the system and method described herein are not limited to any one particular battery type, chemistry and/or arrangement, as a number of different batteries could be employed.

Battery sensors 72 may include any combination of hardware and/or software components capable of monitoring battery conditions such as battery temperature, battery voltage, battery current, battery state of charge (SOC), battery state of health (SOH), etc. These sensors may be integrated within high voltage vehicle battery 18 (e.g., an intelligent or smart battery), they may be external sensors located outside of the battery, or they may be provided according to some other known arrangement. The battery sensors may monitor and determine battery temperature on a cell-by-cell basis, as the average or collective temperature of a block of cells or region of the battery, as the average or collective temperature of the entire battery, or according to some other temperature determining method known in the art. Measuring battery temperature on an individual cell basis may be beneficial if, for example, the middle cells exhibit different temperatures than the edge or boundary cells of battery pack 70. The same principal of determining battery temperature on a cell-by-cell, collective or other basis also applies to battery voltage, battery current, battery SOC, battery SOH, etc. Output from battery sensors 72 may be provided to control unit 74, control module 24, or some other component, device, module and/or system in the vehicle.

Control unit 74 may include any variety of electronic processing devices, memory devices, input/output (I/O) devices, and other known components, and may perform various control and/or communication related functions. For example, control unit 74 could receive sensor signals from the various battery sensors 72, package the sensor signals into an appropriate sensor message, and send the sensor message to control module 24 over a vehicle connection such as a CAN bus, a system management bus (SMBus), a proprietary communication link, or any other communication means known to those skilled in the art. It is possible for control unit 74 to gather battery sensor readings and store them in local memory so that a comprehensive sensor message can be provided to control module 24 at a later time, or the sensor readings can be forwarded to the control module or some other destination as soon as they arrive at control unit 74, to cite a few possibilities. In another capacity, control unit 74 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Low voltage vehicle battery 20 stores energy that may be used to perform secondary or auxiliary functions within the vehicle, such as starting an internal combustion engine or powering certain low voltage vehicle accessories. According to an exemplary embodiment, low voltage vehicle battery 20 includes a traditional 12 V or 42 V lead-acid battery. In one application, low voltage vehicle battery 20 energizes a solenoid and/or a starter motor (not shown) that turns a crankshaft in an internal combustion engine; that is, the low voltage vehicle battery provides the energy for starting or cranking the engine. In another application, low voltage vehicle battery 20 powers one or more vehicle accessories. Examples of potential low voltage accessories include battery heater 16, a radio receiver, DVD player, television, telematics unit and/or other infotainment devices, as well as vehicle interior or exterior lights, auxiliary power plugs, etc. These are, of course, only some of the potential vehicle accessories that may be powered by the low voltage vehicle battery. While an exemplary low voltage battery unit has been discussed, others batteries, materials, designs, embodiments, etc. could be used with equal success.

It should be appreciated that the terms "high voltage vehicle battery" and "low voltage vehicle battery" are not limited to any particular numerical voltage or range. Instead, these terms are relative in that high voltage vehicle battery 18 generally provides a higher voltage than low voltage vehicle battery 20; hence, the high voltage vehicle battery may be used to drive one or more electric motors for vehicle propulsion. Therefore, while some preferred voltage ratings and ranges are provided above for purposes of illustration, the method and system described herein are not limited to such embodiments.

Power module 22 couples the high and low voltage systems or circuits in the vehicle together, and may perform a number of different functions in that capacity. In an exemplary embodiment, power module 22 is an accessory power module (APM) that is electrically coupled to both the high and low voltage vehicle batteries 18, 20 and is electronically coupled to control module 24 for communication purposes. Power module 22 may include any combination of processing and memory resources, as well as transformers and/or other electrical components used for transmitting or exchanging electrical energy between the different components, devices, modules, etc. of the high and low voltage systems. Some examples of possible power module functions include stepping down the DC power from high voltage vehicle battery 18 and using it to charge the low voltage vehicle battery 20, and providing one or more low voltage vehicle accessories with power. It is possible for power module 22 to be combined or otherwise integrated with other devices in the vehicle.

Control module 24 may monitor various conditions around the vehicle, including those pertaining to power supply 12, switch 14, battery heater 16, high voltage vehicle battery 18, low voltage vehicle battery 20, power module 22 and/or other conditions or parameters around the vehicle, and may use the sensed conditions to control the battery heating method described below. Depending on the particular embodiment, control module 24 may be a stand-alone vehicle electronic module, it may be incorporated or included within another vehicle electronic module (such as a power train control module), or it may be part of a larger network or system (such as a battery management system (BMS), a vehicle energy management system, etc.), to name a few possibilities. Control module 24 may perform a number of functions pertaining to the battery heating system 10, as well as ones pertaining to battery charging, for example. In an exemplary embodiment, control module 24 is a vehicle integrated control module (VICM) and is in charge of numerous battery- and power-related tasks, like the battery heating method described herein.

Control module 24 may include any variety of electronic processing devices, memory devices, input/output (I/O) devices, and other known components, and may perform various control and/or communication related functions. The control module can be electronically connected to other vehicle devices and modules via a suitable vehicle communications network, and can interact with them when required. In an exemplary embodiment, control module 24 includes an electronic processing device that executes instructions for software, firmware, programs, algorithms, scripts, etc. that are stored in memory devices of module 24 and govern the battery heating processes and methods described herein. Control module 24 could also store or maintain look up tables (e.g., performance response curves representing cell discharge/charge performance as a function of temperature, etc.), various sensor readings (e.g., sensor readings pertaining to battery temperatures, etc.), and predetermined values used by one or more algorithms (e.g., predetermined condition values, condition calibration values, target temperatures, etc.), for example. These are, of course, only some of the possible functions and capabilities of control module 24, as other embodiments could also be used.

Figure 2:
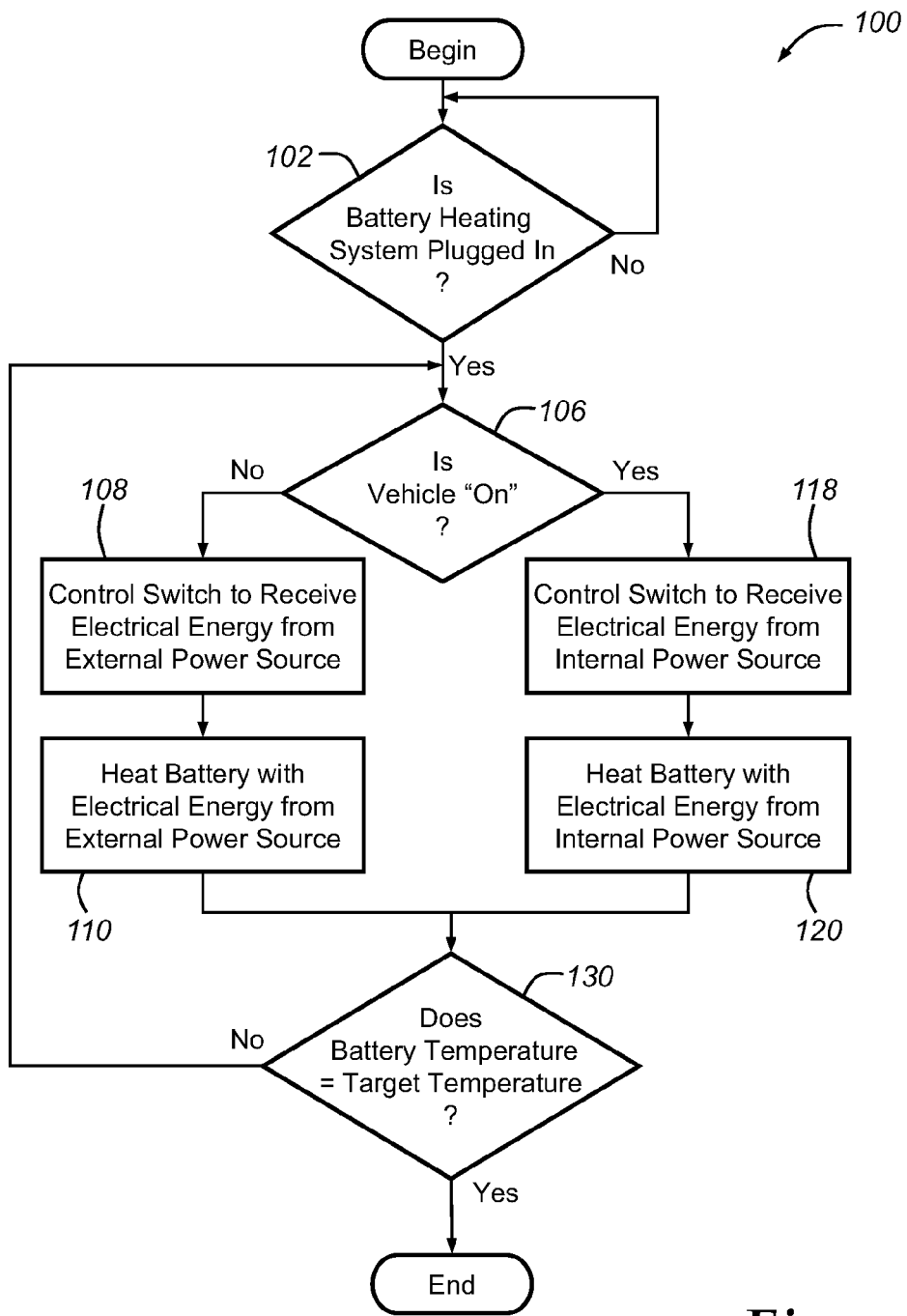
FIG. 2 is a flowchart of an exemplary method that may be used with the battery heating system in FIG. 1 to heat a high voltage vehicle battery.

Turning now to FIG. 2, there is shown an exemplary method 100 that may be used with battery heating system 10 to heat, warm up or otherwise control the temperature of high voltage vehicle battery 18. Exemplary method 100 preferably warms up high voltage vehicle battery 18 with electrical energy from external power source 32 when possible in order to conserve energy within the vehicle and use the cheapest source of available electrical energy (electricity from the public grid is typically less expensive than that generated by the vehicle), but also allows for continued battery heating once battery heating system 10 has been unplugged and the vehicle is being driven. Although not specifically illustrated in FIG. 1, it is possible for battery heating system 10 to be used in a plug-in hybrid electric vehicle (PHEV) where the system receives electrical power from an external power source through the same charge coupling that charges the vehicle; that is, instead of receiving electrical power through a separate power input that only heats the battery. The present system and method may be used with either arrangement.

Skilled artisans will appreciate that some battery types, like those based on lithium-ion chemistries, need to be in a certain temperature range in order to optimally receive and/or provide electrical energy. Consider the example of a hybrid electric vehicle (HEV) that uses a high voltage lithium-ion vehicle battery for propulsion and has been parked overnight in an extremely cold environment (e.g., minus 20° C. or colder). If a vehicle user attempts to start the HEV without first heating the battery, the vehicle may not start. Furthermore, if the vehicle user plugs in battery heating system 10 but does so only for a short amount of time, the battery temperature may be increased enough for the vehicle to start but not enough for the high voltage lithium-ion vehicle battery to sufficiently receive electrical energy. Such a scenario can present challenges, particularly if the HEV over generates or otherwise produces additional electrical energy (e.g., through regenerative braking or as transient energy through operation of the hybrid transmission) as such energy will have no place to go. In most cases, any additional or superfluous energy would simply be stored on the battery, however, if the high voltage lithium-ion vehicle battery is too cold it will not be able to receive the charge. Thus, the method described below uses this additional energy to power battery heating system 10 so that the high voltage vehicle battery can continue to be heated or warmed up and resume normal operation as soon as possible.

Beginning with step 102, the method determines if battery heating system 10 is plugged in or is connected to external power source 32. This step may employ any number of different methods or techniques for making such a determination, including using control module 24 to monitor the status of the electrical connection between power input 40 of power supply 12 and the electrical receptacle of external power source 32. The monitoring that occurs in this step may be of an active nature (e.g., control module 24 may periodically query or send a status request to power supply 12 to determine if the power supply is receiving power from external power source 32), or it may be of a passive nature (e.g., control module 24 may simply listen and wait for a message or other signal from power supply 12 indicating that the power supply has been plugged in). Step 102 is not limited to any one monitoring technique, as a number of suitable techniques may be used. If step 102 determines that battery heating system 10 is not plugged in, then it may loop back for additional monitoring; if step 102 determines that battery heating system 10 is plugged in, then the method may continue to step 106. In a different embodiment not illustrated here, if step 102 determines that the battery heating system is not plugged in, it may begin heating the battery with electrical power from the low voltage vehicle battery on board the vehicle.

Next, step 106 determines if the vehicle is "on." Now, those skilled in the art will appreciate that any number of different criteria or parameters may be used to determine when a hybrid vehicle is "on," and any such criteria or parameters may be used here. In one example, step 106 checks to see if the main electrical contactors in the vehicle (not shown in FIG. 1) have been closed, or if the vehicle propulsion system is "active." An active vehicle propulsion system is sometimes indicated by a flag or other electronic indicator that is set when such a condition occurs. These two events oftentimes occur together or in response to one another and typically indicate that the vehicle user wishes to drive or otherwise operate the vehicle. If a vehicle user remotely or manually starts the vehicle, for example, it is typical for the main electrical contactors to close and/or for the vehicle propulsion system to transition to an "active" state. In such a case, control module 24 could be alerted that the vehicle is now "on" and proceed with the execution of exemplary method 100. Again, other criteria, parameters, factors, etc. could be used to determine if the vehicle is "on," as step 106 is not limited to the examples given here.

If battery heating system 10 is plugged in (as determined in step 102) but the vehicle has not been turned "on" (as determined in step 106), then step 108 may control switch 14 so that it receives electrical energy from external power source 32. According to an exemplary embodiment, if power input 40 is plugged into a wall outlet or other external power source 32 and the vehicle user has not attempted to start the vehicle, then step 108 either changes the state of switch 14 or ensures that it is already in the correct position so that it can provide battery heater 16 with low voltage power from power supply 12. Because electrical energy from the public electricity grid is usually less expensive than that produced by the vehicle and because it is typically desirable to conserve the vehicle's internal power source when possible, switch 14 may be set to the position shown in FIG. 1 as a default position (i.e., set to select external power source 32 by default). Step 108 can double check to make sure that switch 14 is connected to external power source 32 via power supply 12 and, if for some reason it is not, change the state of the switch accordingly. In an exemplary embodiment, control module 24 both monitors and controls the state of switch 14, however, other components, devices, modules, etc. could be used instead. It should be appreciated that power supply 12, switch 14, battery heater 16, low voltage vehicle battery 20 and/or external power source 32 may be coupled to one another directly or coupled to one another indirectly with one or more intervening components, devices, etc.

Step 110 then powers battery heater 16 so that high voltage vehicle battery 18 is heated with electrical energy from external power source 32. Step 130 may be included where it is depicted in FIG. 2 and/or it may be included at some other part of exemplary method 100 in order to determine if the battery temperature of high voltage vehicle battery 18 is equal to some target or minimum temperature. Those skilled in the art will appreciate that there are a number of different ways for a system such as this to monitor and/or maintain the battery temperature so that it stays within a desired or target range, any one of which may be used here. If at any point the battery temperature reaches the target or minimum temperature, then exemplary method 100 may stop.

If battery heating system 10 is plugged in (as determined in step 102) and the vehicle is "on" (as determined in step 106), then the method proceeds to step 118 which controls switch 14 so that it receives electrical energy from one or more internal power sources, such as low voltage vehicle battery 20 and/or power module 22. As mentioned above, this step may include actively changing the operational state of switch 14 or, if the switch is already in the desired state, it may simply involve a confirmation that the switch state is correct. One potential reason for performing this step and transitioning to internal vehicle power is that the method assumes that because the vehicle was turned "on" it is about to be driven away; thus, electrical energy from external power source 32 is not likely to be available for much longer. As previously explained, if the battery temperature is still below a target or minimum temperature, then it may be desirable to continue heating high voltage vehicle battery 18 even though battery heating system 10 has been unplugged.

Step 120 may then power battery heater 16 so that high voltage vehicle battery 18 is heated with electrical energy from an internal power source, like low voltage vehicle battery 20 and/or power module 22. This enables the battery heating process to extend beyond the point that the system is unplugged and continue heating the battery even as the vehicle is driven away. In addition to accelerating the process of battery heating, which in turn reduces the amount of time required before the battery is fully operational, this provides a destination for any transient or other energy that may be generated in the vehicle but cannot be stored on a cold battery. A characteristic of exemplary system 10 that may help enable this feature is that the stepped-down and rectified electrical power provided by power supply 12 is generally the same as that provided by low voltage vehicle battery 20 (e.g., 12 VDC, 42 VDC, etc.). Thus, the system can easily transition and switch from one electrical power source to the other.

In another embodiment, if a vehicle user forgets to plug in battery heating system 10, then the system may still be of value. For example, if the vehicle user does not plug in power input 40 and high voltage vehicle battery 18 is too cold to start, then control module 24 may direct switch 14 to connect battery heater 16 to low voltage vehicle battery 20 and/or power module 22 so that the system uses an internal power source to heat up the high voltage vehicle battery. After a few minutes, the high voltage vehicle battery may be warm enough to start the vehicle and thus avoid a "walk home" scenario that would otherwise require getting the vehicle towed or finding a different source of electrical energy. Consider the same scenario, only high voltage vehicle battery 18 is warm enough so that the vehicle can start, but still too cold to sufficiently receive electrical energy generated during operation. Battery heating system 10 can accelerate the battery heating process once the vehicle is being driven in the manner described above.

It is also possible for a vehicle user to "jump" the vehicle by connecting battery heating system 10 to another car's low voltage battery (e.g., 12 VDC battery) or a portable low voltage power source. In this situation, a vehicle user could use jumper cables to connect a second vehicle's low voltage battery to low voltage vehicle battery 20, and control module 24 could direct switch 14 to receive the 12 VDC power from the new source and power battery heater 16 accordingly.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the exemplary method could include any combination and/or sequence of steps and is not limited to the exemplary embodiment provided herein. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A battery heating system for use with a vehicle, comprising:
    a switch having first and second inputs and an output, the first switch input receives electrical power from an external power source located outside of the vehicle and the second switch input receives electrical power from a separate internal power source located inside of the vehicle;
    a battery heater having an input, the battery heater input is coupled to the switch output and receives electrical power from the switch output;
    a high voltage vehicle battery being at least partially used for vehicle propulsion and being different than the separate internal power source, the battery heater is thermally coupled to the high voltage vehicle battery; and
    a control module being coupled to the switch and being configured to monitor one or more conditions around the vehicle and to control a state of the switch at least partially in accordance with the monitored conditions, wherein the control module is configured to control the state of the switch so that the switch provides the battery heater with electrical power from the external power source when the switch is in a first switch state and the vehicle is plugged into the external power source, so that the switch provides the battery heater with electrical power from the separate internal power source when the switch is in a second switch state and the vehicle is unplugged from the external power source, and so that the switch continues to provide the battery heater with electrical power from the separate internal power source when the vehicle is being driven and while a temperature of the high voltage vehicle battery is below a target temperature.

2. The battery heating system of claim 1, further comprising:
    a power supply having an input and an output, the power supply input plugs into the external power source and the power supply output is coupled to the first switch input, wherein the power supply converts the electrical power from the external power source so that it is generally the same as the electrical power provided by the internal power source.

3. The battery heating system of claim 2, wherein the power supply converts the electrical power from the external power source by stepping down and rectifying a voltage so that it provides the first switch input with lower voltage DC power.

4. The battery heating system of claim 2, wherein the power supply input is fitted with an electrical connector that plugs into a standard electrical wall outlet and receives electrical AC power.

5. The battery heating system of claim 2, wherein the power supply output is fitted with an electrical connector that removably connects with the first switch input so that the power supply can be installed after the vehicle is manufactured.

6. The battery heating system of claim 1, wherein the switch is a relay switch and connects either the external power source or the internal power source to the battery heater depending on the state of the switch.

7. The battery heating system of claim 1, wherein the switch transitions from the first switch state to the second switch state when either the battery heating system is disconnected from the external power source or a vehicle propulsion system is made active, and in the first switch state the switch output is connected to the first switch input and in the second switch state the switch output is connected to the second switch input.

8. The battery heating system of claim 1, wherein the battery heater is a battery blanket that is at least partially wrapped around the vehicle battery so that the battery heater is thermally coupled to the vehicle battery.

9. The battery heating system of claim 1, wherein the internal power source is a low voltage lead-acid battery used for low voltage applications in a hybrid vehicle or a battery electric vehicle (BEV).

10. The battery heating system of claim 1, wherein the vehicle battery is a high voltage lithium-ion battery used for vehicle propulsion in a hybrid vehicle or a battery electric vehicle (BEV).

11. The battery heating system of claim 1, wherein the battery heater first heats the vehicle battery with electrical power from the external power source, and then heats the vehicle battery with electrical power from the internal power source.

12. A battery heating system for use with a vehicle, comprising:
    a power supply having an input and an output, the power supply input receives high voltage electrical power from an external power source located outside of the vehicle and the power supply output provides low voltage electrical power;
    a low voltage vehicle battery having an output, the low voltage vehicle battery output provides low voltage electrical power;
    a battery heater having an input, the battery heater input is selectively coupled to the power supply output when the power supply input is connected to the external power source and battery heating is needed and the battery heater input is selectively coupled to the low voltage vehicle battery output when the power supply input is disconnected from the external power source and battery heating is needed; and
    a high voltage vehicle battery being at least partially used for vehicle propulsion, wherein the battery heater is thermally coupled to the high voltage vehicle battery and the battery heater heats the high voltage vehicle battery with electrical power from the power supply when the power supply input is connected to the external power source, and the battery heater heats the high voltage vehicle battery with electrical power from the low voltage vehicle battery when the vehicle is being driven and while a temperature of the high voltage vehicle battery is below a target temperature.

13. A method for heating a vehicle battery that is at least partially used for vehicle propulsion, comprising the steps of:
    (a) determining if a battery heating system is plugged into an external power source located outside of the vehicle, wherein the battery heating system includes a switch, a battery heater, and a vehicle battery;
    (b) if the battery heating system is coupled to the external power source, then providing electrical power from the external power source to the battery heater through the switch in a first switch state;
    (c) if the battery heating system is decoupled from the external power source, then providing electrical power from an internal power source to the battery heater through the switch in a second switch state, wherein the internal power source is separate from the vehicle battery; and
    (d) using the battery heater to heat the vehicle battery with electrical power from the external power source when the switch is in the first switch state, and using the battery heater to heat the vehicle battery with electrical power from the separate internal power source when the switch is in the second switch state and the vehicle is being driven while a temperature of the high voltage vehicle battery is below a target temperature.

14. The method of claim 13, wherein step (a) further comprises determining if the battery heating system is coupled to the external power source by monitoring a status of an electrical connection between a power supply located inside the vehicle and the external power source located outside the vehicle.

15. The method of claim 13, wherein step (b) further comprises stepping down a voltage of the electrical power from the external power source before providing it to the battery heater through the switch.

16. The method of claim 13, further comprising the steps of:
    (e) determining if a vehicle propulsion system is active; and
    (f) if the vehicle propulsion system is active, then changing the first switch state of the switch to the second switch state of the switch so that the battery heater heats the vehicle battery with electrical power from an internal power source instead of the external power source.

17. The method of claim 15, wherein step (d) further comprises determining if a vehicle propulsion system is active by determining if one or more main electrical contactors in the vehicle are closed.

18. The method of claim 13, further comprising the steps of:
    (d) sensing a battery temperature for the vehicle battery;
    (e) determining if the battery temperature exceeds the target temperature; and
    (f) if the battery temperature does exceed the target temperature, then stopping heating the vehicle battery.

* * * * *